F. R. PARKER.
GAS COCK.
APPLICATION FILED OCT. 10, 1908. RENEWED FEB. 2, 1914.

1,121,282.

Patented Dec. 15, 1914.

WITNESSES:
R. G. Parker
Otis R. Hasty

INVENTOR:
Frederick R. Parker.

UNITED STATES PATENT OFFICE.

FREDERICK R. PARKER, OF CHICAGO, ILLINOIS.

GAS-COCK.

1,121,282. Specification of Letters Patent. Patented Dec. 15, 1914.

Application filed October 10, 1908, Serial No. 457,140. Renewed February 2, 1914. Serial No. 816,099.

*To all whom it may concern:*

Be it known that I, FREDERICK R. PARKER, a citizen of the United States of America, residing at Chicago, in the county of Cook and State of Illinois, have invented a new and useful Gas-Cock, of which the following is a specification, reference being had to the accompanying drawings, illustrating same.

My invention relates to valves or cocks in general and more particularly to gas cocks having safety appliances whereby the gas cannot be accidentally turned on after it is once shut off.

The principal objects of my invention are, to provide an improved safety valve or cock in which the valve plug is not raised out of its seat during the operation of the valve, and in which the valve cannot be accidentally opened after being shut off; to provide a safety valve or cock of the character stated, in which the valve-operating mechanism is free to be operated when the valve is closed, without opening the valve or without operating the plug; and to provide an improved construction in such a valve or cock.

Other objects will be apparent from the following specification.

Figure 1:
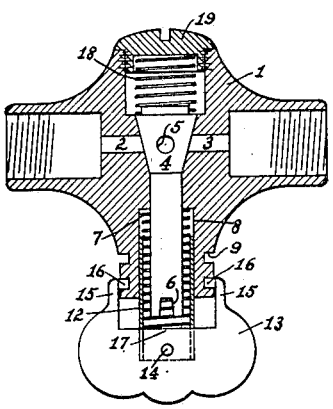
Figure 2:
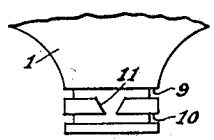
Figure 3:

In the accompanying drawings Figure 1 is a longitudinal cross-sectional view of the preferred form of valve of this invention, with portions shown in elevation. Fig. 2 is a side elevation of the lower portion of the valve casing, showing the details of construction thereof; and Fig. 3 is a cross-sectional view of the thumb-leaf shown in Fig. 1, showing the details of construction thereof.

Like characters refer to like parts in the several figures.

In some safety valves or cocks of the character herein set forth, it is customary to raise the valve plug out of its seat in opening the valve, or to lock the thumb-leaf so that it cannot be turned when the valve is in closed position. Raising the plug out of its seat is objectionable because it allows dirt or foreign particles to lodge between the plug and the seat so that the plug will not be tightly seated when the valve is closed. Locking the thumb-leaf so that it cannot be turned when the valve is in closed position, is objectionable, because if it is accidentally struck while in locked position it may be broken off.

In my present invention I provide a safety valve in which the plug is not raised out of its seat when the valve is opened, and in which the thumb-leaf is free to be turned clear around as much as desired when the valve is in closed position, without opening the valve. The advantages of such a valve can be readily seen.

By reference to the accompanying drawings 1 represents a valve casing having an inlet passage 2 and an outlet passage 3. Intersecting the passage 2 3 is a tapered valve seat in which is fitted a tapered plug 4 as shown, the tapered portion of the plug 4 being provided with a hole 5 therethrough to connect the passages 2 and 3 together when turned into alinement therewith. The lower end of the plug projects from the valve casing and is provided with a notch 6 therein as shown. The plug 4 is held down in its seat by a coil spring 18 which is held in place by a cap screw 19 as shown. A coil spring 7 and a tube 12 surround the lower end of the plug and extend into a hole 8 in the lower end of the casing 1. The lower end of the casing 1 is provided with a pair of annular grooves 9 and 10 therearound and with V-shaped passages 11 on opposite sides of the casing connecting the grooves 9 and 10. To the tube 12 is secured a thumb-leaf 13, by a pin 14, preferably as shown. The upper portion of the thumb-leaf 13 is provided with a pair of arms 15 15 each of which is provided at its free end with a V-shaped inturned portion 16 adapted to slidably fit in grooves 9 and 10 of the casing 1. The lower portion 17 of the thumb-leaf 13, inside the tube 12 and above the pin 14, is adapted to engage the notch 6 in the plug when the thumb-leaf is turned across the valve and is raised so that the inturned portions 16 16 thereof pass through the passages 11 11 into the groove 9 of the casing. The coil spring 7 acts between the casing 1 and the part 17 of the thumb-leaf 13, tending to throw the thumb-leaf 13 and the tube 12 downwardly.

When it is desired to open the valve the thumb-leaf 13 is first turned across the valve and is then forced upwardly whereupon the portions 16 16 of the thumb-leaf pass through the passages 11 11 from the annular groove 10 to the annular groove 9, in the meantime the portion 17 engaging the notch 6 in the lower end of the plug 4.

Now the thumb-leaf 13 is turned one way or the other, the plug 4 being turned also because it is now locked to the thumb-leaf. As the plug is turned, the passage 2 5 3 is gradually opened through the valve, in a manner well understood. When it is desired to close the valve the thumb-leaf 13 and plug 4 are turned in either direction whereupon the passage 2 5 3 through the valve is gradually closed. When the thumb-leaf and plug are turned far enough to just about close the passage 2 5 3, the spring 7 forces the thumb-leaf to its lower position, out of engagement with the plug 4, by forcing the arms 16 16 through the passages 11 11 from the annular groove 9 to the annular groove 10, the tapered portions 11 11 and 16 16 acting to turn the plug still farther after the passage 2 5 3 is practically closed, to turn the hole 5 in the plug substantially across the valve, as shown in Fig. 1, to positively close the valve. Now the thumb-leaf 13 can be turned around as much as desired in this lower position without opening the valve, as the plug 4 is now entirely free from any turning parts. The portions 6 and 17 are preferably tapered somewhat so as to provide a freer release between these parts when the valve is being closed.

I do not wish to limit this invention to all of the particular details herein set forth, as various modifications thereof may be made or utilized without departing from the scope of the appended claims.

By the term "thumb-piece" or "thumb-leaf" I desire it to be understood that I contemplate any suitable device or mechanism by means of which a valve plug, stem, or plunger may be operated. By the term "plug" I desire it to be understood that I contemplate any suitable device or mechanism for forming an obstruction to the valve passage.

What I claim as my invention is:

1. A valve having a casing and a plug projecting from the casing, the latter having a pair of annular grooves therein around the plug and a pair of tapered passages connecting the said annular grooves, a tubular member and a coil spring therein surrounding the projecting end of the plug and entering the said casing, a thumb-leaf attached to the tubular member and having arms adapted to work in the said annular grooves, the walls of the latter holding the thumb-leaf in either a raised or a lowered position as desired, and means on the projecting end of the plug coöperating with the thumb-leaf whereby the latter and the plug are locked together when the thumb-leaf is placed in raised position.

2. A valve having a casing with a plurality of annular recesses in association therewith, said recesses being connected by suitable passages, a valve plug, a thumb-piece having arms coöperating with the said recesses whereby it may be held in a plurality of positions, the said thumb-piece being in inoperative relation with the plug in one of the said positions and in operative relation therewith in another of the said positions, and being adapted to be turned in each of the said positions, and means for automatically throwing the thumb-piece from one of the said positions to another when the valve is being closed.

3. A valve having a casing with a plurality of annular recesses therein, said recesses being connected by suitable passages, a valve plug member, a tubular member and a coil spring entering the casing around a portion of the said plug member, a thumb-piece positioned by the said tubular member and having arms coöperating with the said recesses whereby the thumb-piece may be held in a plurality of positions, the said thumb-piece being in inoperative relation with the said plug member in one of the said positions and in operative relation therewith in another of the said positions, and being adapted to be turned in each of the said positions, the said coil spring serving to throw the thumb-piece from one of the said positions to another when the valve is being closed.

4. In a valve of the character set forth, a valve plug, operating mechanism exterior of the plug, positioned by the valve casing and adapted for causing the operation of the plug, and means for automatically throwing the said mechanism to inoperative relation with the plug when the valve is being closed.

5. In a valve of the character set forth, a valve plug, operating mechanism for causing the operation of the plug, the said mechanism having a portion with annular passageways therein associated therewith for accommodating a portion of the said mechanism whereby the latter may be held in operative and inoperative relations, respectively, with the plug and turned in each of these positions, and means for automatically throwing the said mechanism entirely away from the said plug when the valve is being closed.

6. A valve having a casing with annular passageways in association therewith, a valve plug apart from the said passageways, operating mechanism for the plug normally in inoperative relation therewith, and adapted to coöperate with the said passageways whereby the said operating mechanism may be held in a plurality of positions and turned in each position, and means whereby the said operating mechanism is placed in operative relation with the said plug when moved to one of its said positions.

7. A valve having a casing with annular passageways in association therewith, a valve plug apart from the said passageways, operating mechanism for the plug normally in inoperative relation therewith, the said operating mechanism having portions thereon coöperating with the said passageways whereby the said operating mechanism may be held in a plurality of positions and turned in each position, means whereby the said operating mechanism is placed in operative relation with the said plug when moved to one of its said positions, and means for automatically throwing the said operating mechanism out of operative relation with the said plug when the valve is being closed.

8. In a valve of the character set forth, a valve plug having a projecting end with a slot thereacross, operating mechanism for the plug normally in inoperative relation therewith but having a portion adapted to enter the said slot when properly positioned whereby the said plug may be operated as desired, and means for holding the said operating mechanism in operative relation with the said plug.

9. In a valve of the character set forth, a valve plug having a projecting end with a slot thereacross, operating mechanism for the plug normally in inoperative relation therewith but having a portion adapted to enter the said slot when properly positioned whereby the said plug may be operated as desired, means for holding the said operating mechanism in operative relation with the said plug, and means for automatically throwing the said operating mechanism out of operative relation with the said plug when the valve is being closed.

10. In a valve of the character set forth, a valve plug having a slotted end, a thumbpiece having a portion adapted to enter the said slot for operating the plug, and means for automatically throwing the said thumbpiece out of operative relation with the said plug when the valve is being closed.

11. In a valve of the character set forth having a casing, a valve plug, operating mechanism wholly exterior of the plug, when in inoperative relation therewith, positioned by the valve casing and adapted for causing the operation of the plug, means for holding the said operating mechanism in operative relation with the plug, and means for automatically throwing the said operating mechanism to inoperative relation with the plug when the valve is being closed.

12. A valve having a casing with annular passageways in association therewith, a valve plug apart from the said passageways, operating mechanism for the plug adapted to coöperate with the said passageways whereby the said operating mechanism may be held in a plurality of positions and turned in each position, and means for automatically throwing the said operating mechanism to inoperative relation with the plug when the valve is being closed.

13. In a valve of the character set forth having a casing, a valve plug having a projecting end, operating mechanism normally wholly exterior of the plug positioned by the valve casing, normally in inoperative relation with the plug and adapted to coöperate with the projecting end of the plug to cause the operation thereof, means for holding the said operating mechanism in operative relation with the plug, and means for automatically throwing the said operating mechanism to inoperative relation with the plug when the valve is being closed.

14. In a valve of the character set forth having a casing, a valve plug having a projecting end, operating mechanism positioned by the valve casing and adapted to coöperate with the projecting end of the plug to cause the operation thereof, and means for automatically throwing the said operating mechanism out of operative relation with the plug when the valve is being closed.

15. A valve comprising a body portion having a passage therethrough for fluid and an opening therein intersecting said passage, a tapering valve plug having a recess in one end and a single passage therethrough, said plug fitting in said opening and being arranged to be rotated to bring its passage into and out of register with the passage through said body portion, a slidable and rotatable valve operating stem lying wholly outside of said valve plug and having means at one end arranged to engage in the recess in said valve plug for rotating the latter, said valve stem being slidable into and out of operative relation with said valve plug, and means tending to hold said valve stem in its inoperative position.

16. A valve having a plug, slidable and rotatable valve-operating mechanism normally lying wholly outside of said plug and away therefrom and having means for engaging said plug to rotate the latter, the said mechanism being slidable into and out of operative relation with said plug, means for holding the said mechanism in its operative position, and means for automatically throwing the said mechanism to its inoperative position when the valve is being closed.

As inventor of the foregoing I hereunto subscribe my name this 12th day of September, 1908.

FREDERICK R. PARKER.

Witnesses:
R. G. PARKER,
OTIS R. HASTY.